United States Patent
Hawkins et al.

(10) Patent No.: US 7,943,076 B1
(45) Date of Patent: May 17, 2011

(54) METHOD OF MANUFACTURING CURVED COMPOSITE STRUCTURAL ELEMENTS

(75) Inventors: Robert D. Hawkins, Bonney Lake, WA (US); Andrew E. Modin, Enumclaw, WA (US); Edoardo P. Depase, Seattle, WA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 12/363,746

(22) Filed: Jan. 31, 2009

Related U.S. Application Data

(63) Continuation-in-part of application No. 11/119,756, filed on May 3, 2005.

(51) Int. Cl.
*B29C 70/44* (2006.01)
*B29C 37/00* (2006.01)

(52) U.S. Cl. ........ 264/258; 264/236; 264/163; 156/196; 156/285; 156/264

(58) Field of Classification Search ................ 264/257, 264/258, 137, 236, 163; 156/196, 285, 264
See application file for complete search history.

(56) References Cited

U.S. PATENT DOCUMENTS

| | | | | |
|---|---|---|---|---|
| 5,038,291 A * | 8/1991 | Wang et al. | ..................... | 700/98 |
| 5,648,109 A * | 7/1997 | Gutowski et al. | ............. | 425/504 |
| 7,670,525 B2 * | 3/2010 | Weidmann et al. | ........... | 264/255 |
| 7,790,082 B2 * | 9/2010 | Buge et al. | ..................... | 264/258 |
| 2002/0149134 A1 * | 10/2002 | Hemphill et al. | ............. | 264/255 |
| 2006/0216480 A1 | 9/2006 | Weidmann et al. | | |
| 2006/0249868 A1 | 11/2006 | Brown et al. | | |
| 2007/0029038 A1 * | 2/2007 | Brown et al. | ................. | 156/297 |
| 2007/0161483 A1 | 7/2007 | Raf et al. | | |

FOREIGN PATENT DOCUMENTS

GB 763972 A 9/1953

OTHER PUBLICATIONS

International Search Report, The Boeing Company, May 12, 2010.

\* cited by examiner

*Primary Examiner* — Joseph S Del Sole
*Assistant Examiner* — Nahida Sultana
(74) *Attorney, Agent, or Firm* — Tung & Associates

(57) ABSTRACT

A curved composite element is laid up over a tool having first and second curved tool surfaces possessing differing radii of curvatures. A plurality of composite fiber ply segments are arranged in substantially side-by-side relationship into a group. The ply segments are formed as a group onto the first curved tool surface, and the group is then formed from the first curved tool surface onto the second curved tool surface.

22 Claims, 10 Drawing Sheets

US 7,943,076 B1

METHOD OF MANUFACTURING CURVED COMPOSITE STRUCTURAL ELEMENTS

CROSS REFERENCE TO RELATED APPLICATIONS

This application is a continuation-in-part of U.S. patent application Ser. No. 11/119,756 filed May 3, 2005, published on Nov. 9, 2006 as Publication No. US 2006-0249868 A1, and is related to U.S. patent application Ser. No. 12/104,529, filed Apr. 17, 2008, and U.S. patent application Ser. No. 11/195,786 filed Aug. 3, 2005, published Feb. 8, 2007 as Publication No. 20070029038 A1, the entire disclosures of which applications are incorporated by reference herein.

TECHNICAL FIELD

This disclosure generally relates to composite structures, and deals more particularly with manufacturing curved load-carrying structural elements from composite materials.

BACKGROUND

A variety of curved or contoured, load carrying structural elements may be formed from composite materials. These structural elements may be formed by laying up multiple plies of fiber reinforced resin material in which the fibers may be unidirectional within the ply. In some cases, it may be difficult for the unidirectional fibers to follow the contours of the structural member. In order to avoid wrinkling of the plies as they are laid up, existing processes may use hand layup techniques to place and then form the plies in place. In some cases, braided preforms may be used in conjunction with infusion processes to achieve wrinkle free ply layup. In still another technique, short segments of unidirectional composite materials may be laid up by hand over a tool in order to collectively form a single ply. These existing processes are labor intensive, rely on operator skill and are time consuming.

Accordingly, there is a need for a method of manufacturing curved composite structural elements which addresses one or more of the issues discussed above.

SUMMARY

The disclosed embodiments provide a method of manufacturing curved composite structural elements that employs a more efficient layup technique and may reduce the need for capital equipment. The disclosed method may facilitate the use right-sized equipment and may allow some operations to be performed in parallel, thus permitting some operations involving positioning of the plies to be performed "off of the tool."

According one disclosed method embodiment, a curved composite element is fabricated using a plurality of composite fiber ply segments clamped together as a group to form a ply. The clamped group of ply segments is placed against a first tool surface following which the clamped group is wrapped onto a second tool surface. The ply segments may be arranged in side-by-side relationship to each other with a substantially uniform fiber orientation. Clamping of the group of ply segments may be performed by placing the group in a frame. The frame may be used to wrap the ply segments over the curved tool surfaces.

According to another method embodiment, a curved composite element is laid up over first and second tool surfaces respectively having first and second radii of curvature. A group of composite fiber ply segments is arranged substantially in side-by-side relationship. The group of ply segments is formed onto the first curve tool surface, and is then formed onto the second tool surface. In one variation, the group of fiber plies is formed from a greater curvature to a lesser curvature, while in another variation, the ply group is formed from a lesser curvature to a greater curvature on the tool. Gaps may be formed between the fibers in at least some of the ply segments along an edge of the segments to facilitate forming from a lesser curvature to a greater curvature.

The disclosed embodiments satisfy the need for a method of manufacturing curved composite structural elements that may be more efficient, less labor intensive and require less capital equipment compared to prior processes.

BRIEF DESCRIPTION OF THE ILLUSTRATIONS

FIG. 12b is an end view of the ply spreading device shown in FIG. 12a.

FIG. 13b is an end view of the spreading device shown in FIG. 13a.

DETAILED DESCRIPTION

Figure 1A:
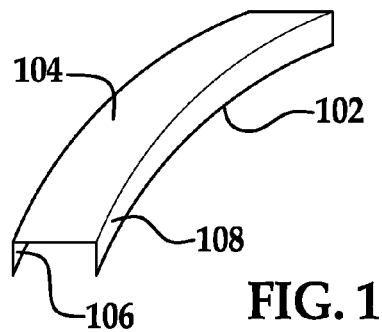
FIG. 1A is a perspective view illustrating a curved structural element with a "C"-shaped cross section.
Figure 1B:
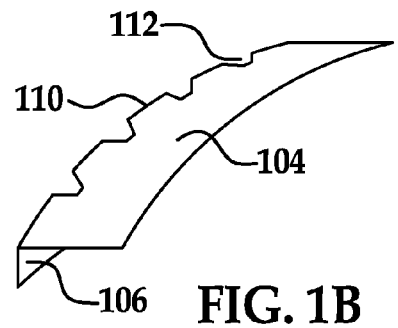
FIG. 1B is a perspective view illustrating a curved structural element with an "L"-shaped cross section.

FIG. 1A illustrates an example of a composite structural element 102 with a curved planar surface, or web surface, 104 and two side, or cap, surfaces 106, 108 forming a "C"-shaped cross section that may be produced by a method of an embodiment of the disclosure. Similarly, FIG. 1B shows an example of a composite structural element 110 with a curved planar surface, or web surface, 104 and one flange, side or cap surface 106, including several cutaways, or "mouse holes," 112 that may be produced using a method of an embodiment of the present disclosure. These two exemplary structural elements 102, 110 correspond to an embodiment of a first frame section, or shear tie, (110) and an embodiment of a second frame section, or floating frame, (102) used as structural support elements in an aircraft fuselage. Examples of these components may be found in US Patent Publication No. 2008 0230652 A1 published Sep. 25, 2008, and U.S. Pat. No. 7,134,629 issued Nov. 14, 2006, the disclosures of which are hereby incorporated in their entirety. However, alternative embodiments of this disclosure may be used to produce any compatible load carrying element, including stiffeners, beams and frames, such as those used in pressure vessels, other composite containers, boats, trains, submersibles, arches, buildings, bridges, seismic upgrades, window frames or door frames.

In an embodiment of the present disclosure, structural elements are manufactured from a composite material, for example, a polymer matrix, epoxy, BMI or a polyester thermosetting plastic, such as PEEK, PEKK, or PPS reinforced with fibers, such as carbon, aramid, glass, Kevlar, boron, Hybor or quartz, possibly intermixed with metal, metal foil, such as TiGr, or fiber metal laminate. These composite materials generally are "cured" into a stronger form through an endothermic chemical reaction, which requires the addition of energy, for example, by way of heating or irradiation. Examples of composite materials used in various embodiments of this disclosure include graphite fiber reinforced epoxy, fiber reinforced plastic (FRP), glass-fiber reinforced plastic (GRP), carbon-fiber reinforced plastic (CRP), metal matrix composites (MMC), and reinforced carbon-carbon (carbon fiber in a graphite matrix).

Figure 2:
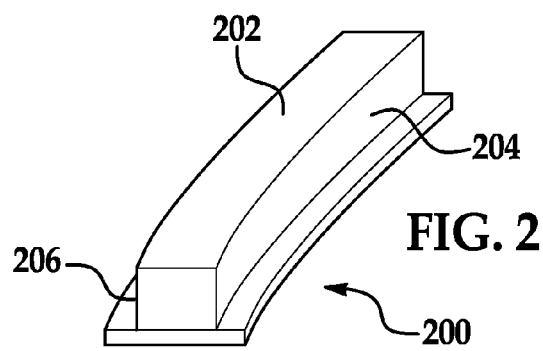
FIG. 2 is a perspective view illustrating a manufacturing tool, or mandrel, in accordance with an embodiment of the method or process.

An embodiment of the present disclosure can include a hand, or manual, layup process, or an automated layup process, wherein a composite material, such as a composite fabric or a composite tape, is placed on a manufacturing tool. An exemplary embodiment of a manufacturing tool, or mandrel 200, is illustrated in FIG. 2. An exemplary mandrel 200 can include a web surface 202, which corresponds to the curved planar surface 104 of the structural element 102, 110 shown in FIG. 1A and FIG. 1B. The exemplary mandrel 200 also can include an inner side, or cap, surface 204; an outer side, or cap, surface 206; or both inner and outer side, or cap, surfaces 204, 206. In other embodiments, the exemplary mandrel 200 can include a near-endless combination of other surfaces.

An embodiment of the present disclosure can include a fiber placement process, in which an advanced fiber placement (AFP) machine can be used to fabricate a curved web ply of a structural element. As is known in the art, the fiber placement process typically involves the automated placement of multiple "tows" (that is, untwisted bundles of continuous filaments, such as carbon or graphite fibers, pre-impregnated with a thermoset resin material such as an epoxy commonly known as "prepreg tow") or slit composite tape ("slit tape") onto a manufacturing tool, or mandrel. Conventional fiber placement machines dispense multiple tows to a movable payoff head that collimates the tows (that is, renders the tows parallel) and applies the tows to a mandrel surface using one or more compaction rollers that compress the tows against the surface. A typical tow may be between about 0.12 inch and 0.25 inch wide when flattened. In addition, such machines typically include means for dispensing, clamping, cutting and restarting individual tows during placement.

Slit tape is a composite tape that has been slit after being produced in standard widths by the manufacturer. Slitting the tape results in narrower widths that allow enhanced maneuverability and tailoring during application in order to achieve producibility and design objectives. For example, in a particular embodiment, a 12-inch wide tape is cut into ninety-six even slits of ⅛ inch each. Generally, slit tape can have widths varying from about 0.12 inch up to about six inches, and may or may not include backing paper.

Figure 3:
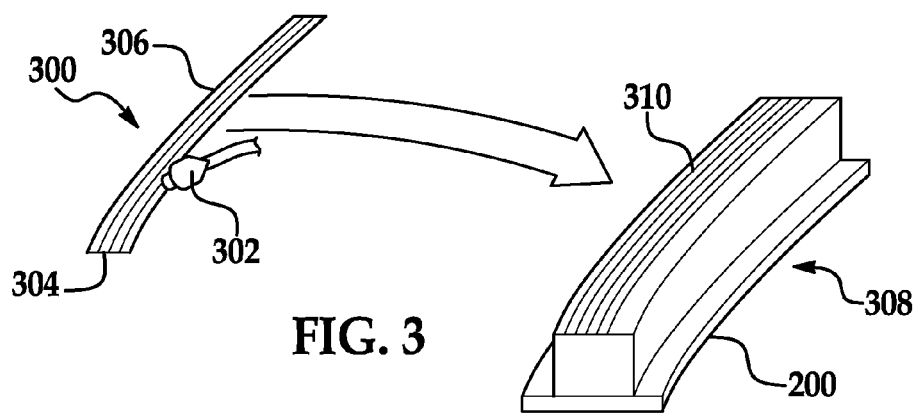
FIG. 3 is a perspective view illustrating a fabrication and layup process of a 0-degree web ply of a composite material.

An exemplary embodiment of a fiber placement process 300 according to the present disclosure is illustrated in FIG. 3. In this exemplary embodiment, an advanced fiber placement (AFP) machine 302 can lay contiguously adjoined strips 304 of a composite material, either slit tape or prepreg tow, in a planar arc 306, that is, in the shape of a curve on a flat surface. As a result, the fibers of the slit tape or tow are oriented in alignment with the longitudinal centerline of the arc along the full length of the curve without distortion of the fibers, such as wrinkles. In a particular embodiment, the curved structural element includes the shape of a planar arc with uniform radius. Nevertheless, other embodiments include structural elements with a curvature of non-uniform radius, or a complex contour that does not lie in a plane. In a particular embodiment of this disclosure, rather than being placed directly onto a mandrel, the strips 304 of composite material are placed over a removable substrate, such as mylar, which may be attached, for example, to a metal caul plate. In an alternative embodiment, the AFP machine 302 can place multiple plies, one over another, creating a thicker grade ply.

Various processes of the present disclosure also can include a web ply trimming process, in which a web ply can be trimmed to remove excess composite and substrate material from the edges of the web ply. For example, in an exemplary embodiment of a web ply trimming process, a numerically-controlled ply cutting machine can cut a web ply to conform to the shape of a perimeter of a possibly curved web surface of a mandrel or other similar manufacturing tool, such as that shown in FIG. 2.

An embodiment of the present disclosure can also include a web ply layup process, in which a web ply is manually or automatically placed on a mandrel, or other manufacturing tool, such as that shown in FIG. 2. An exemplary embodiment of a web ply layup process 308 according to the present disclosure also is illustrated in FIG. 3. In this exemplary embodiment, a web ply 310 such as that fabricated in the fiber placement process 300 can be placed on mandrel 200 using a manual or automated layup process. The web ply 310 can be oriented on the curved web surface 202 of the mandrel such that the composite fibers are aligned with the centerline of the curved surface along the full length of the arc. The web ply 310 is generally referred to as a 0-degree ply, a naming convention referencing the angle of the fibers with respect to the centerline of the surface. The substrate material can then be removed from the surface of the web ply 310. In an alternative embodiment, the web ply 310 can be laid up over a previous ply, which may be a web ply or another type of ply, on the mandrel 200.

Figure 4:
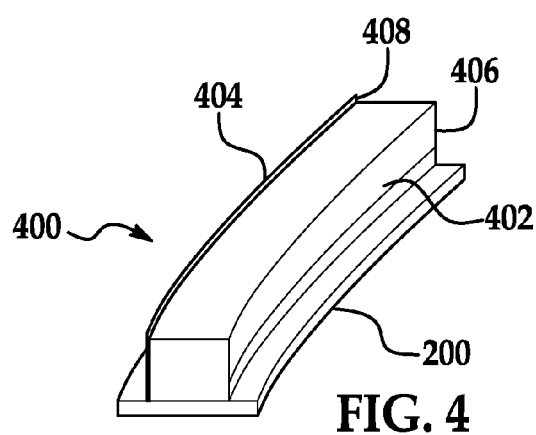
FIG. 4 is a perspective view illustrating the layup of a 0-degree cap ply of a composite material.

In an alternative embodiment of the present disclosure, a cap ply layup process 400, i.e., a process where a cap ply is manually or automatically placed on a mandrel (or other manufacturing tool) such as that shown in FIG. 2, can be used. FIG. 4 depicts an example of a cap ply layup process 400 according to the present disclosure. In this example, a cap ply 402 can be laid up on the exemplary mandrel or other manufacturing tool, such as that shown in FIG. 4. The cap ply 402 can consist of a composite tape, for example, approximately two inches wide, and can be placed on a mandrel 200 such that the orientation of the tape fibers runs in a lengthwise, or substantially 0-degree, direction along the cap surface 106. As further shown in FIG. 4, a single cap ply 402 or 404 can be laid up on one side of the mandrel 200 in order to form an "L"-shaped cross section with a single flange, such as that of the exemplary structural element in FIG. 1B, and a second cap ply 404 or 402 can be applied to the opposite side of the mandrel 200 in order to form a "C"-shaped cross section with two flanges, such as that of the exemplary structural element in FIG. 1A.

In the case of either or both cap plies 402 and 404 splices 406 and 408 can be formed along the corner of the mandrel 200 where the cap ply 402 and 404 meets the web ply 310. In this way, the cap ply or plies 402 and 404 and the web ply form a continuous, substantially 0-degree ply across the web surface 202 and one or both cap surfaces 106 and 108. Since the splices 406 and 408 do not interrupt the 0-degree fibers along the length of the web and cap surfaces, which are designed to carry tensile loads in the longitudinal direction of the web and cap surfaces, the splices 406, 408 do not affect the load-bearing capacity of the structural elements 102 and 110. An alternative embodiment of the disclosure can include 0-degree cap plies 402 and 404, without a 0-degree web ply 310.

Figure 5:
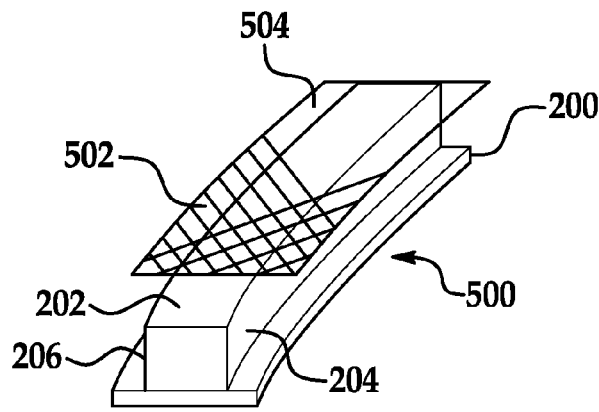
FIG. 5 is a perspective view of the layup of a 45-degree diagonal ply of a composite material on a manufacturing tool.

In yet another exemplary embodiment of the present disclosure, a diagonal ply layup process 500 wherein a diagonal ply can be manually or automatically placed on a mandrel is depicted in FIG. 5. In this example, a diagonal ply 502 can be placed on the mandrel 200 so that the fibers are oriented on the bias at approximately positive (+) and negative (−) 45 degrees from the centerline of the web surface of the mandrel 200. The composite fabric 504 in a present embodiment is a prepreg composite fabric pre-impregnated with a resin. However, in other embodiments, the composite fabric 504 may include any suitable type of composite fabric, including a dry form composite fabric. Although the diagonal ply shown in FIG. 5 includes a sheet of composite fabric 504, an alternative embodiment can include a diagonal ply formed from strips of composite tape laid up on the mandrel 200 so that the tape fibers are oriented at approximately +45 degrees or −45 degrees from the centerline of the web surface of the mandrel. Furthermore, alternative embodiments can include a diagonal ply with the fibers oriented on a bias at any angle between 0 and 90 degrees from the centerline of the web surface, for example, at positive and negative 60 degrees.

In order to form the flange, side, or cap, surfaces of the structural element, the material of the diagonal ply 502 is cut wider than the web surface 202 of the mandrel 200 so that at least one edge of the diagonal ply 502 can be folded over the side of the mandrel 200. A single edge of the diagonal ply 502 can be folded over the outer cap surface 206 of the mandrel 200 in order to form an "L"-shaped cross section, such as that of the example structural element shown in FIG. 1B. Alternatively, in order to prevent or minimize wrinkling, the diagonal ply 502 can be first placed on the inner cap surface 204 of the mandrel 200 and then folded over the curved web surface 202 by tensioning and uniformly spreading the fibers across the curved web surface 202 to form an "L"-shaped cross section. In addition, the diagonal ply 502 optionally can be folded over the outer cap surface 206 of the mandrel 200, in order to form a "C"-shaped cross section, such as that of the example structural element shown in FIG. 1A. Similarly, the diagonal ply 502 can be first placed on the curved web surface 202 by tensioning and uniformly spreading the fibers across the curved web surface 202 and then folded over the outer cap surface in order to form an "L"-shaped cross section, such as that of the example structural element shown in FIG. 1B.

Figure 6:
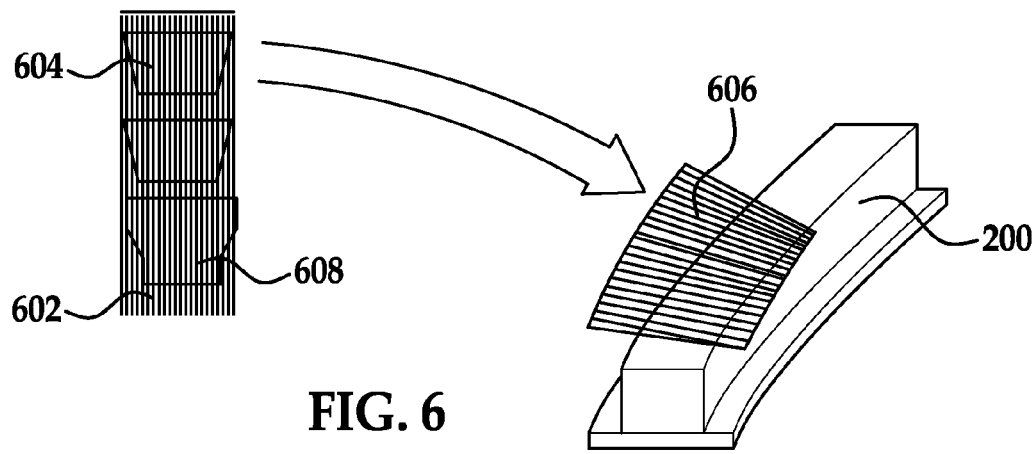
FIG. 6 is a perspective view illustrating the layup of a 90-degree cross ply of a composite material.

Other embodiments of the present disclosure can include a cross ply layup process 600, i.e., a process where a ply is placed in a fashion similar to that shown in FIG. 6. First, a unidirectional composite tape 602 is cut into segments. For example, the tape can be cut into trapezoidal segments 604, as shown in FIG. 6. For the purposes of this disclosure, the term "trapezoidal" is used in the sense of its common meaning in American English, with reference to a quadrilateral having only two sides parallel, as opposed to the common meaning in British English, with reference to a quadrilateral having no two sides parallel. The term commonly used in British English for a quadrilateral having only two sides parallel is "trapezium."

Returning to FIG. 6, the two non-parallel sides of the trapezoidal tape segments 604 can be cut at an angle such that when laid up on the mandrel 200 the two non-parallel edges of the tape segment will be substantially perpendicular to the tangent of the longitudinal centerline of the curved or web surface 202 of the mandrel 200. The tape segments 604 then can be laid up on the exemplary mandrel 200 in order to form a cross ply 606 with fibers oriented approximately at a right angle with the centerline of the web surface 202 of the mandrel 200, without forming wrinkles in the tape segments 604.

As in the diagonal ply example described above, the cross ply 606 can be cut wider than the web surface of the mandrel 200 such that one or two edges of the cross ply 606 can be folded over the side or sides of the mandrel 200 in order to form flange, side, or cap, surfaces. In one embodiment, the tape can be cut into modified "funnel" shape segments 608, such that the edge or edges of the tape segment 608 that fold over the cap surfaces 204, 206 of the mandrel 200 have parallel sides and the portion over the web surface 202 of the mandrel 200 has nonparallel sides. In an alternative embodiment, the tape can be cut into rectangular segments and allowed to overlap or to form gaps between the tape segments when laid up on the mandrel 200. Once again, in this way a "C"-shaped cross section or an "L"-shaped cross section can be formed.

Alternatively, in order to prevent or minimize wrinkling, the cross ply 606 can be first placed on the inner cap surface 204 of the mandrel 200 and then folded over the curved web surface 202 by tensioning and uniformly spreading the fibers across the curved web surface 202 in order to form an "L"-shaped cross section. In addition, the cross ply 606 optionally can also be folded over the outer cap surface 206 of the mandrel 200, in order to form a "C"-shaped cross section, such as that of the example structural element shown in FIG. 1A. Similarly, the cross ply 606 can be first placed on the curved web surface 202 by tensioning and uniformly spreading the fibers across the curved web surface 202 and then folded over the outer cap surface in order to form an "L"-shaped cross section, such as that of the example structural element shown in FIG. 1B.

Figure 7:
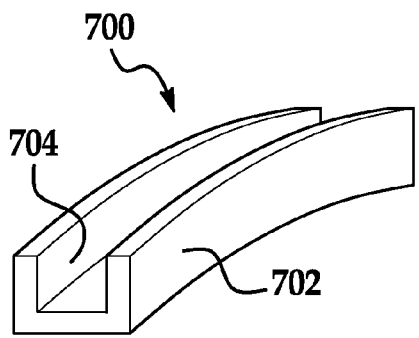
FIG. 7 is a perspective view illustrating a structural element layup that has been transferred onto a concave manufacturing tool.

FIG. 7 illustrates a transfer process 700, in which a structural element layup is transferred from a convex mandrel (or other manufacturing tool) to a concave manufacturing tool 702. In the present example of FIG. 7 a concave manufacturing tool 702, or female mandrel, is illustrated. In this example, structural element plies previously allowed to cure as laid up on a convex manufacturing tool, such as the exemplary mandrel 200 of FIG. 2, may be optionally transferred to a concave manufacturing tool 702 for curing. In the present embodiment the concave manufacturing tool 702 conforms to the external surface of the structural element layup.

In an alternative embodiment, plies can be laid up directly on a concave manufacturing tool, such as that shown in FIG. 7, rather than being laid up on a convex manufacturing tool. In this case, the plies can be allowed to cure as laid up on the concave manufacturing tool, or optionally transferred to and cured on a convex tool.

Figure 8:
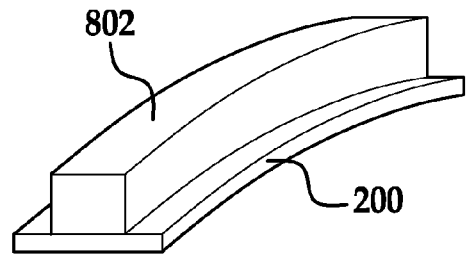
FIG. 8 is a perspective view illustrating the enclosure of a structural element layup in a sealed vacuum bag for curing.

Another exemplary process of the present disclosure can include a sealing process, in which a structural element layup is sealed inside a vacuum bag in order to remove trapped air from inside and underneath a composite material, between layers of composite plies and between a composite material and a respective mandrel. An exemplary embodiment of a vacuum bag 802 encasing a structural element on an exemplary mandrel 200 layup is illustrated in FIG. 8. Similarly, an exemplary embodiment of a vacuum bag 704 encasing a structural element layup on a concave manufacturing tool 702 is illustrated in FIG. 7.

Figure 9:
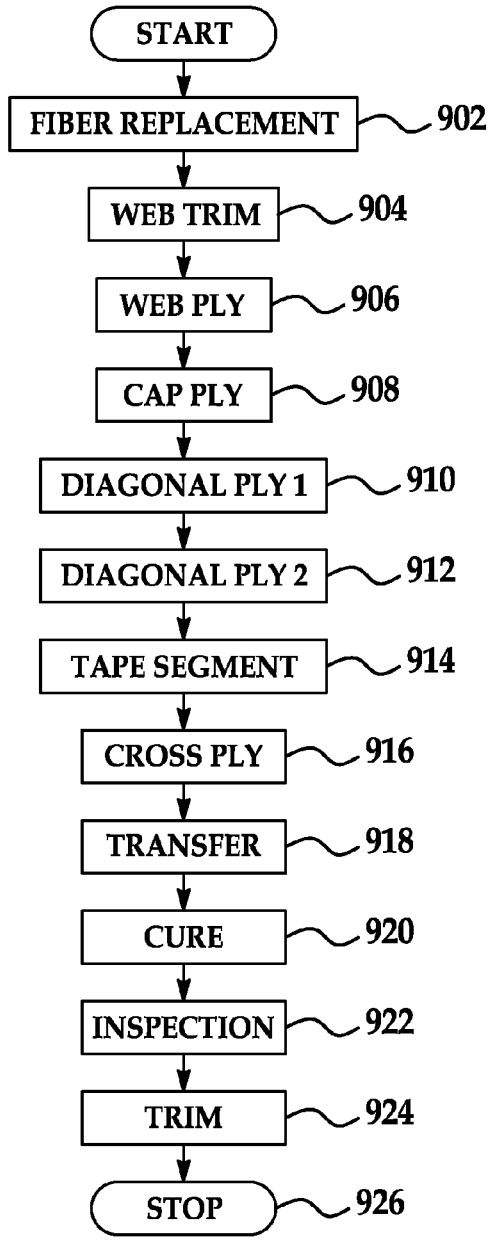
FIG. 9 is a flowchart illustrating steps that may be followed to manufacture a curved composite structural element.

FIG. 9 is a flowchart outlining an exemplary method according to the present disclosure for manufacturing a curved composite structural element. The process starts in step 902 where an advanced fiber placement (AFP) machine lays contiguously adjoined strips of a composite material. As discussed above, in various embodiments the composite material can be in the form of either slit tape or prepreg tow. Additionally, as discussed above, the AFP machine can place the strips in any number of viable or useful shapes, such as the exemplary planar arc shown in FIG. 3, with the fibers of the slit tape or tow oriented in alignment with the longitudinal centerline of the arc along the full length of the curve, without distortion of the fibers, such as wrinkles. As further discussed above, the strips of composite material can be placed over a removable substrate, such as mylar. Furthermore, in an alternative embodiment the AFP machine can place multiple plies, one above another, creating a thicker grade ply. The process continues to step 904.

In step 904, a web ply can be trimmed to remove excess composite and substrate material from the edges of the web ply. In this step, a numerically-controlled ply cutting machine can cut the web ply to the shape of the perimeter of the web, or curved, surface of a mandrel, or other similar manufacturing tool, such as that shown in FIG. 2. Next, in step 906, web ply can be laid up on a mandrel, or other similar manufacturing tool, such as that shown in FIG. 2. The web ply can be laid up using a manual or automated layup process, orienting the composite fibers in a 0-degree direction aligned with the centerline of the curved web surface of the mandrel or other tool along the full length of the arc, such as the web ply shown in FIG. 3. In addition, the substrate material can be removed from the surface of the web ply during this step. In various embodiments, a web ply can be laid up directly on the mandrel or other tool, or alternatively, over a previous ply or combination of plies on the mandrel or other tool. In addition, various embodiments may include more than one web ply in combination with other plies. The process continues to step 908.

In step 908, a cap ply can be manually or automatically laid up on a manufacturing tool, such as the mandrel shown in FIG. 2. As discussed above, the cap ply can consist of composite tape, and can be placed on the mandrel or other tool such that the orientation of the tape fibers runs in a lengthwise, or 0-degree, direction along the cap surface, such as the exemplary cap ply layup shown in FIG. 4. A single cap ply can be laid up on one side of the mandrel or tool in order to form an "L"-shaped cross section with a single flange, such as that of the example structural element shown in FIG. 1B, plus a second cap ply can be applied to the opposite side of the mandrel in order to form a "C"-shaped cross section with two flanges, such as that of the example structural element shown in FIG. 1A, forming a continuous 0-degree ply across the web surface and one or both cap surfaces. In various embodiments, a cap ply can be laid up directly on the mandrel or other tool, or alternatively, over a previous ply or combination of plies on the mandrel or other tool. In addition, various embodiments may include more than one cap ply in combination with other plies. The process continues to step 910.

In step 910, a +/−45-degree diagonal ply of composite fabric can be manually or automatically laid up on a mandrel, or other similar manufacturing tool, such as that shown in FIG. 2. The diagonal ply can be placed on the mandrel or other tool so that the fabric fibers are oriented at approximately +/−45 degrees from the centerline of the web surface of the mandrel or other tool, such as the diagonal ply shown in FIG. 5. As discussed above, in various embodiments the composite fabric can take the form of any suitable composite fabric, including a prepreg composite fabric pre-impregnated with a resin. In various embodiments, a diagonal ply can be laid up directly on the mandrel or other tool, or alternatively, over a previous ply or combination of plies on the mandrel or other tool. In addition, various embodiments may include more than one diagonal ply in combination with other plies. The process continues to step 912.

In step 912, in order to form side, or cap, surfaces of the structural element the composite fabric of the diagonal ply can be cut wider than the web surface of the mandrel or other tool so that at least one edge of each diagonal ply can be folded over the side of the mandrel or other tool. A single edge of the diagonal ply can be folded over one side of the mandrel or other tool in order to form an "L"-shaped cross section, such as that of the example structural element shown in FIG.

1B, or two edges of the diagonal ply can be folded over two sides of the mandrel or other tool in order to form a "C"-shaped cross section, such as that of the example structural element shown in FIG. 1A. Alternatively, in order to prevent or minimize wrinkling of the composite fabric over the inner cap surface of the mandrel, the diagonal ply can be first adhered to the inner cap surface and then folded over the web surface, stretching the composite fabric as necessary to prevent or minimize wrinkling on the cap surface or on the web surfaces. In addition, the diagonal ply can then be folded over the outer cap surface, stretching the composite fabric as required to prevent or minimize wrinkling on the web surface or on the outer cap surface. The process continues to step 914.

In step 914, a unidirectional composite tape can be cut into segments, such as the exemplary tape segments shown in FIG. 6. Next, in step 916, the tape segments can be manually or automatically laid up on a mandrel or other similar manufacturing tool. As discussed above, the fibers of the tape segments can be aligned at substantially 90 degrees with the centerline of the web surface of the mandrel or other tool in order to form a 90-degree cross ply. In the case of trapezoidal or modified "funnel" shape tape segments, the fibers can be oriented approximately at a right angle with the centerline of the web surface of the mandrel or other tool, without overlapping or creating gaps between the tape segments, and without forming wrinkles in the tape.

As in the case of the diagonal ply above, the cross ply can be cut wider than the web surface of the mandrel or other tool, and one or two edges of the cross ply can be folded over the side or sides of the mandrel or other tool in order to form side or cap surfaces. Once again, in this way a structural element with a "C"-shaped cross section or an "L"-shaped cross section can be formed. In various embodiments, a cross ply can be laid up directly on the mandrel or other tool, or alternatively, over a previous ply or combination of plies on the mandrel or other tool. In addition, various embodiments may include more than one cross ply in combination with other plies. The process then continues to step 918.

In step 918, the structural element layup may optionally be transferred to a concave manufacturing tool, e.g., a female mandrel. As discussed above, the concave tool or mandrel can conform to the external surface of the structural element layup, as shown in FIG. 7. Next, in step 920, the structural element layup can be allowed to cure while sealed inside a vacuum bag on a mandrel or other tool, as shown in FIG. 8, or on a concave tool or mandrel, as shown in FIG. 7. As discussed above, the vacuum can remove trapped air from inside the composite material and from underneath the composite material, between layers of the composite plies and between the composite material and the mandrel. The process continues to step 922.

In step 922, after the structural element layup has cured, it can be inspected to verify compliance with the design specifications. Next, in step 924, the structural element layup can be trimmed, if necessary, to remove any excess material. In addition, cutouts, or "mouse holes," such as those shown in FIG. 1B, can be trimmed into the structural element. Control continues to step 926 where the process stops.

The example embodiment of the flowchart in FIG. 9 described above includes only one web ply, one cap ply, one diagonal ply, and one cross ply. However, other embodiments may include any number of plies in any combination laid up in any order. For example, a floating frame with a "C"-shaped cross section, such as the exemplary structural element shown in FIG. 1A, can include eighteen plies on the web surface and twenty-eight plies on each of the two cap surfaces. In this embodiment, the method could include laying up half of the plies in the following order:

a 45-degree diagonal ply on the web and both cap surfaces
    a cap ply on each of the two cap surfaces
    an additional cap ply on each of the two cap surfaces
    a web ply on the web surface and a cap ply on the two cap surfaces
    a 45-degree diagonal ply on the web and cap surfaces
    a cap ply on each of the two cap surfaces
    an additional cap ply on each of the two cap surfaces
    a 45-degree diagonal ply on the web and cap surfaces
    a cross ply on the web and cap surfaces
    a 45-degree diagonal ply on the web and the cap surfaces
    a cap ply on each of the two cap surfaces
    a 45-degree diagonal ply on the web and cap surfaces
    a cross ply on the web surface and on the two cap surfaces
    a 45-degree diagonal ply on the web and cap surfaces The second half of the plies on the web surface and each of the cap surfaces in this example could then be laid up on the mandrel in the opposite order of the first half to form a mirror image, or symmetrical, layup order, for a total of eighteen plies on the web surface and twenty-eight plies on each of the two cap surfaces.

Another example structural element with a "C"-shaped cross section, such as the exemplary structural element shown in FIG. 1A, can include the same ply combination as the previous example, except that the two longitudinal extremes of the web surface each can include an additional ten plies covering the last twelve inches of the web surface at each extreme of the structural element. In this embodiment, two additional diagonal plies can be laid up on the web surface at each extreme of the structural element simultaneously with the two cap plies after the first 45-degree diagonal ply, and before the first 0-degree web ply, of the previous example.

In addition, two additional cross plies can be laid up on the web surface at each extreme of the structural element simultaneously with the two cap plies after the second diagonal ply, and before the third diagonal ply, of the previous example. Furthermore, a 0-degree web ply can be laid up simultaneously with the cap ply before the final three plies of the previous example. Similarly, a symmetrical ply order can be obtained by laying up an additional 0-degree web ply, two additional cross plies, and two additional diagonal plies in the opposite order between the second half plies of the previous example.

In this last example, each of the additional plies (of the first half of the symmetrical layers) can extend, for example, one half inch farther toward the center of the structural element than the previous. That is, for example, the first additional 45-degree diagonal ply can extend twelve-and-a-half inches from each end of the structural element layup; the second additional 45-degree diagonal ply can extend thirteen inches from each end of the layup; the first additional cross ply can extend thirteen and a half inches from each end of the layup; the second additional cross ply can extend fourteen inches from each end of the layup; and the additional web ply can extend fourteen-and-a-half inches from each end of the layup. In order to form a symmetrical, or mirror image, layup order, the five additional plies of the second half of the symmetrical layers each can extend one half inch less than the previous.

As a further example, a shear tie with an "L"-shaped cross section, such as the exemplary structural element shown in FIG. 1B can include twenty-four plies. In this embodiment, the method can include laying up half of the plies in the following order:

a 45-degree diagonal ply on the web and both cap surfaces a cross ply on the web and cap surfaces a 45-degree diagonal ply on the web and cap surfaces a web ply on the web surface and a cap ply on the two cap surfaces a 45-degree diagonal ply on the web and the cap surfaces a cross ply on the web surface and on the two cap surfaces a 45-degree diagonal ply on the web and the cap surfaces a web ply on the web surface and a cap ply on the two cap surfaces a 45-degree diagonal ply on the web and cap surfaces a cross ply on the web surface and on the two cap surfaces a 45-degree diagonal ply on the web and cap surfaces a web ply on the web surface and a cap ply on the two cap surfaces The second half of the plies in this example can then laid up on the mandrel in the opposite order of the first half to form a mirror image, or symmetrical, layup order, for a total of twenty-four plies on the web surface and on each of the two cap surfaces.

Referring now to FIGS. 10, 14, 15 and 17, a male forming tool 1002 may be used to layup and form one or more prepreg charges 1400 each comprising a plurality of ply segments 1100 arranged side-by-side in a single ply group 1405. The forming tool 1002 may be employed, for example, to fabricate a composite structural element similar to 102 shown in FIG. 1A having a generally "C"-shaped cross section. The forming tool 1002 includes a curved, substantially planar tool surface 1008 which is contiguous to a pair of curved tool surfaces 1010 and 1012. Tool surface 1010 is curved about an inner radius 1004, and tool surface 1012 is curved about an outer radius 1006. The curved tool surfaces 1010 and 1012 may be used to respectively form the caps 108, 106 shown in FIG. 1A, and curved tool surface 1008 may be used to form the web 104, with a thickened area 1008. Further, the forming tool 1002 may be also used to cure the composite structural element.

Figure 14:
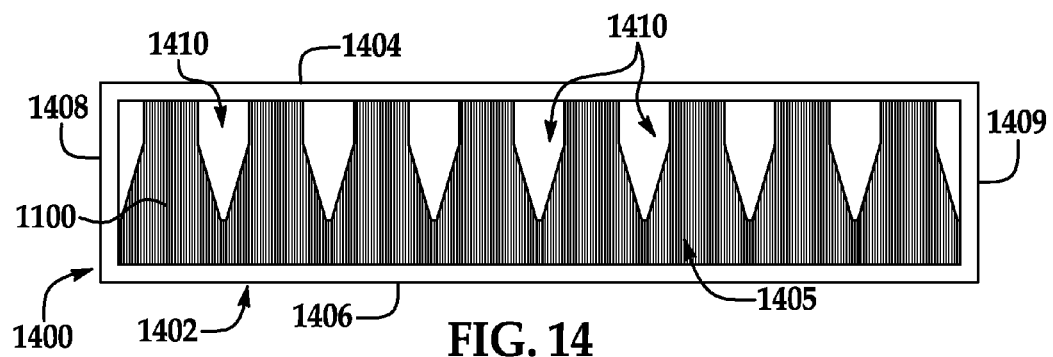
FIG. 14 is a plan view illustrating a group of ply segments which have been spread using the spreading device shown in FIGS. 12a-13b, wherein the group is clamped in a frame.
Figure 15:
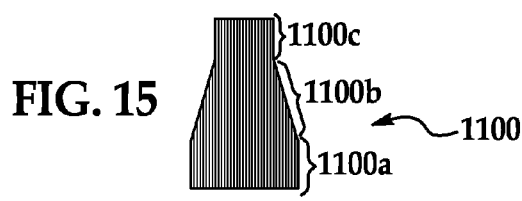
FIG. 15 is a plan view of one of the ply segments shown in FIG. 14.
Figure 17:
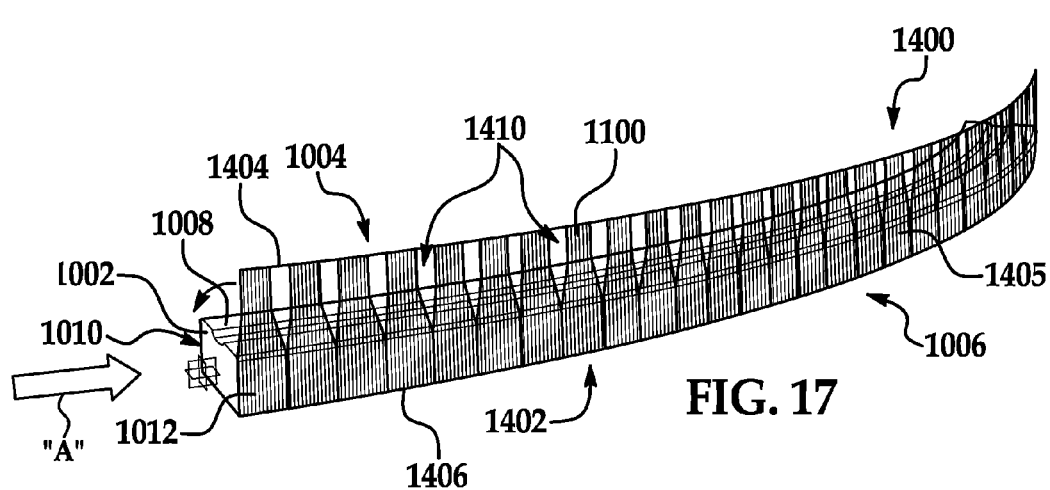
FIG. 17 is a perspective view illustrating the ply group having been formed over a first curved surface of the tool shown in FIG. 10 using the frame illustrated in FIGS. 14 and 16.

In the illustrated embodiment, as shown in FIG. 15, each of the ply segments 1100 in the group 1405 (FIG. 14) has a generally tapered or funnel-like shape formed by a full width base 1100a and a reduced width 1100c connected by a tapered middle section 1100b. As shown in FIGS. 14 and 17, when arranged in side-by-side relationship, the tapered shape of the ply segments 1100 form gaps 1410 between adjacent ones of the ply segments 1100. The funnel-like shape of the ply segments 1100 is generally similar to the ply segments 608 previously discussed in connection with FIG. 6, except that the fibers in ply segments 1100 are spread in a direction normal to their orientation 1102 such that the fibers are continuous.

The layup charge 1400 formed by the group 1405 of ply segments 1100 is joined within a frame 1402 which is used to hold the ply segments 1100 as they are being formed as a group 1405 over the forming tool 1002. The frame 1402 includes top and bottom rails 1404, 1406, and a pair of side rails 1408 and 1409. The frame 1402 may be formed of a flexible material which allows the frame 1402 to be bent and/or folded and/or stretched as will be discussed below.

Figure 16:
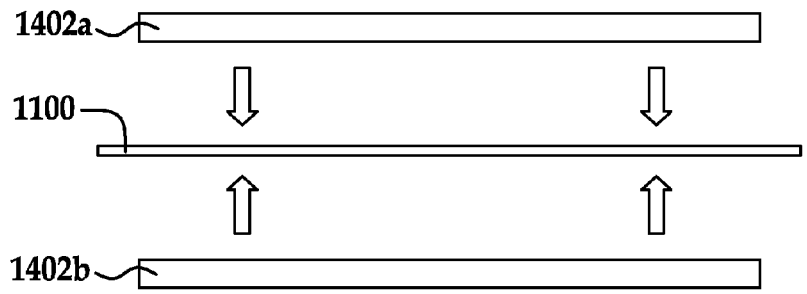
FIG. 16 is an exploded, side view of the frame shown in FIG. 14.

In one exemplary embodiment, as shown in FIG. 16, the frame 1402 may comprise two halves 1402a, 1402b which may be fastened together to join the layup charge 1100 therebetween. The frame 1402 supports the ply segments 1100 and maintains their positions relative to each other within the group during the layup and forming process. Likewise, the base 1100a of the segments 1100 may be joined and held by the bottom rail 1406.

Each of the ply segments 1100 may be formed from a sheet (not shown) of composite material having unidirectional reinforcing fibers. The ply segments 1100 are arranged in such that the reinforcing fibers have a common centerline orientation which, in the embodiment shown in FIGS. 14 and 17, is a 90 degree orientation relative to the longitudinal axis 1000 (FIG. 10) of the forming tool 1002. However, other fiber orientations may be used, including, for example and without limitation, +/−45 degree orientations (unidirectional tape). For example and without limitation, as shown in FIG. 11b, a fiber segment 100 may have a fiber orientation 1104 of 45 degrees.

FIGS. 11a and 12a-13b illustrate one technique for shaping the ply segments 1100 to form the funnel-like shape shown in FIG. 15. Substantially rectangular ply segments 1100 having a unidirectional fiber orientation 1102 may be cut from a roll or sheet of bulk composite material (not shown). Opposite ends of the ply segments 1100 are then respectively placed in first and second clamps 1202, 1204 forming part of a spreading device 1200. The second clamp 1204 includes a plurality of individual clamping elements 1206 which are displaceable relative to each other, as indicated by the arrows 1300 in FIG. 13a. With the ply segments 1100 tightly clamped and held in tension by the spreading device 1200, wedges 1208 move between the clamping elements 1206 which result in lateral displacement of the clamping elements 1206.

Figure 20:
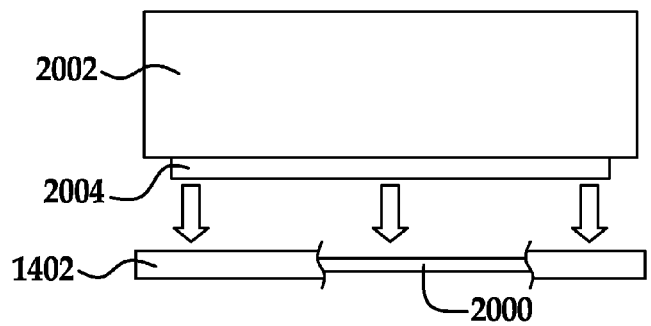
FIG. 20 is a side view illustrating the use of a tool to form the cut-outs in the group of ply segments shown in FIG. 14.

The lateral displacement of the clamping elements 1206 results in spreading of the base 1100a and middle sections 1100b of the ply segment 1100, thereby forming the funnel shape illustrated in FIGS. 15 and 17. Other techniques, however, may be employed to shape the ply segments 1100, including cutting. For example, as shown in FIG. 20, with a layup charge 2000 held in the clamping frame 1402, a tool 2002 having a cutting die 2004 may be used to produce the cut-outs 1410 (FIG. 14) in the charge 2000.

Figure 10:
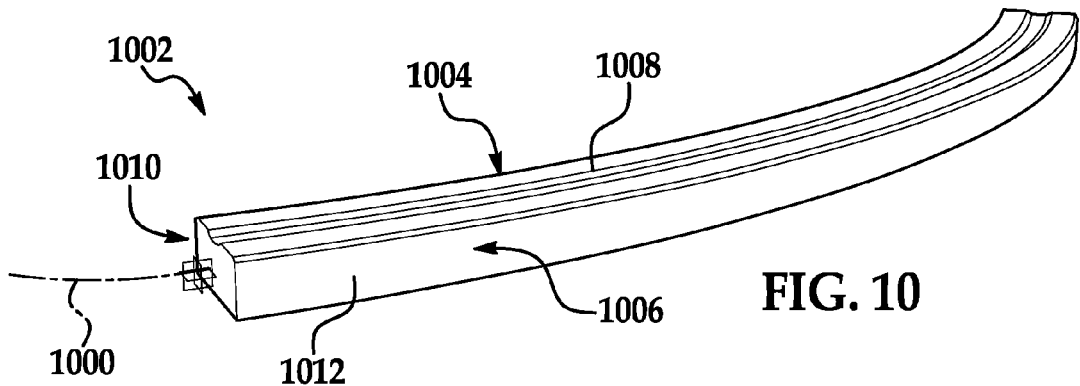
FIG. 10 is a perspective view of a tool having multiple curved tool surfaces used in laying up and forming curved composite structural elements.

Referring particularly to FIGS. 10 and 17, with the group 1405 of ply segments 1100 forming the layup charge 1400 joined in the frame 1402, the charge 1400 may be formed from the larger radius 1006 to the smaller radius 1004 of the forming tool 1002. The forming procedure may be carried out by placing the frame 1402 against the outer tool surface 1012 and then bending the frame 1402 around the outer radius 1006 until a portion of the charge 1400 corresponding to the width 1100a shown in FIG. 15 is brought into engagement with the tool surface 1012 and conforms to the outer radius 1006.

Figure 18:
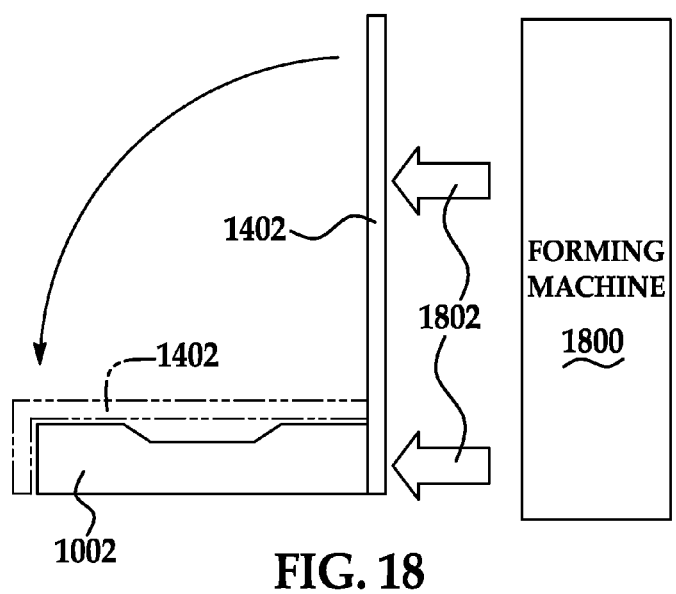
FIG. 18 is an end view taken in the direction of the arrow "A" in FIG. 17 and further illustrating a forming machine.
Figure 19:
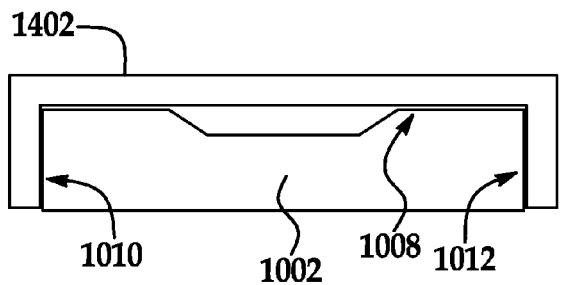
FIG. 19 is a view similar to FIG. 18 but showing the frame having been wrapped over the tool.

Referring to FIGS. 18 and 19, bending of the frame 1402 during the forming process may be performed by hand, or in some embodiments, may be carried out by a forming machine 1800. The forming machine 1800 may apply forces shown by the arrows 1802 to the frame 1402, causing the latter to initially form over the curved outer tool surface 1012 corresponding to the outer radius 1006. Next, the forming machine 1800 may fold the frame 1402 over onto the curved flat tool surface 1008. Finally, the frame 1402 is folded over onto the curved inner tool surface 1010 corresponding to the inner radius 1004, following which the frame 1402 may be removed from the formed charge 1402. In other embodiments, the frame 1402 may remain on the charge 1400 until curing is complete.

From the description above, it may be appreciated that a prepreg charge 1400 is formed over the forming tool 1002 by pre-arranging and holding ply segments 1100 in a group 1405 using the frame 1402, and that the frame 1402 is used to form the charge 1400 from the larger radius of curvature 1006 to the smaller radius of curvature 1004.

Figure 21:
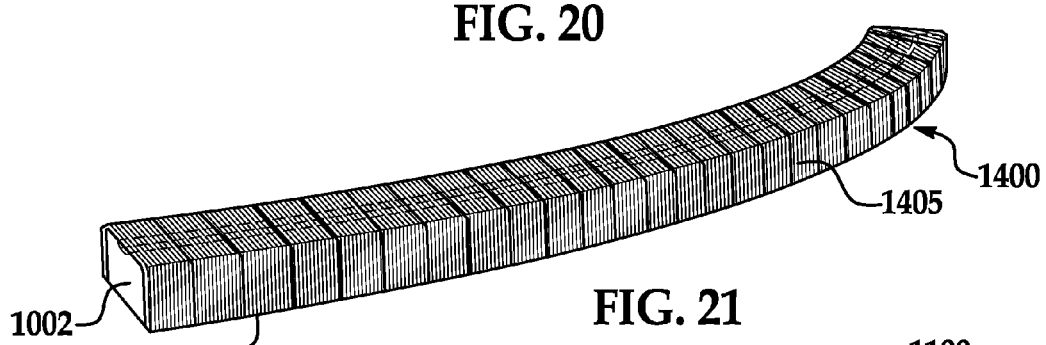
FIG. 21 is a perspective view illustrating the group of ply segments having been fully formed over the tool.

In some embodiments, the frame 1402 may include hinge points (not shown) to facilitate folding of the frame 1402 during the forming process. The forming operation can be performed mechanically using a mechanism, such as the previously discussed forming machine 1800, that drives the ply segments 1100 as a group 1405 toward the smaller radius of curvature 1004. In an alternate embodiment, the forming operation may be performed using an elastomeric vacuum bag (not shown) which folds or stretches the frame 1402 over the tool 1102. FIG. 21 illustrates the charge 1400 having been fully formed over the tool 1002 while remaining joined within the frame 1402. As previously mentioned, the formed charge 1400 may remain joined in the frame 1402 until the charge 1400 is fully cured, or may be removed before the curing process.

It should be noted here that while the method of forming a composite structural element described above has been illustrated in connection with the fabrication of a "C"-shaped cross sectional element, the method may be employed to produce other structural elements having various cross sections including, but not limited to L-shapes, Z-shapes, J-shapes, F-shapes and E-shapes.

Figure 22:
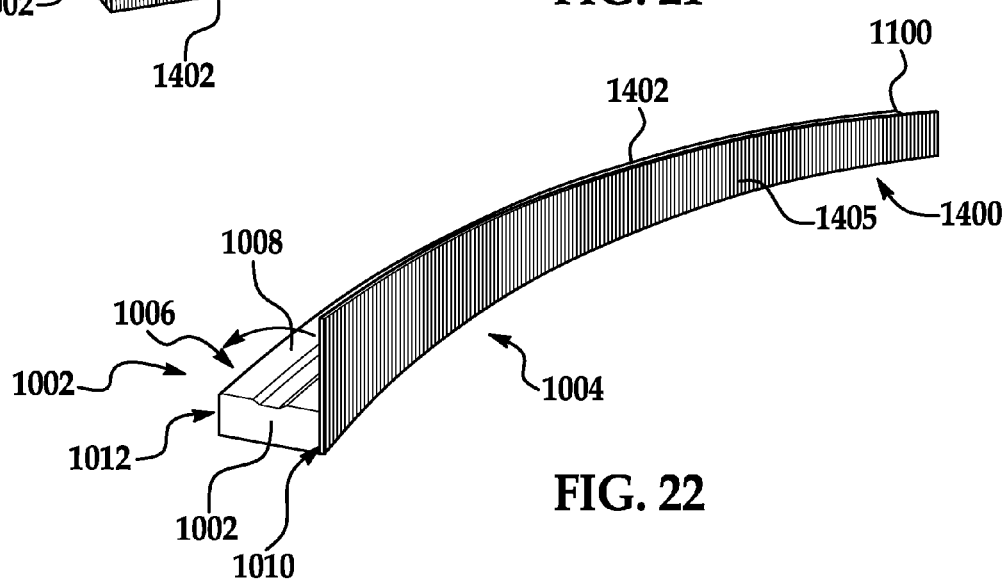
FIG. 22 is a perspective view illustrating a group of ply segments clamped in a frame in preparation for forming over an undulating tool surface.
Figure 23:
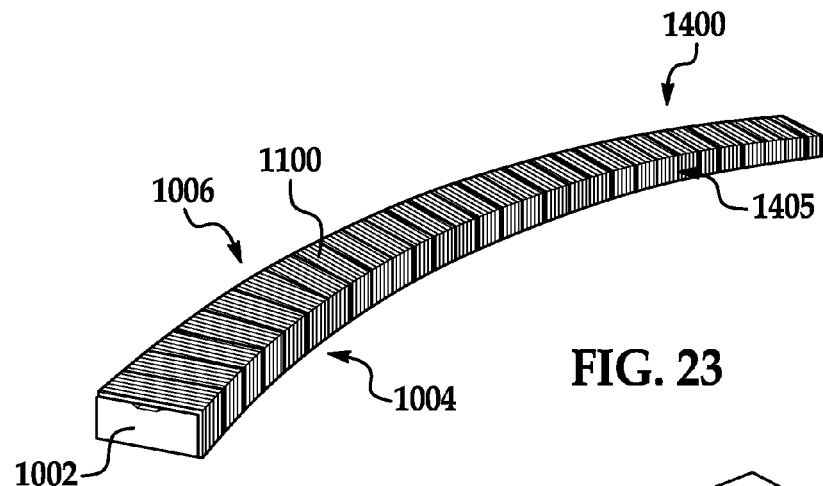
FIG. 23 is a view similar to FIG. 22 but illustrating the ply group having been fully formed over the tool

Referring now to FIGS. 22 and 23, as previously discussed in connection with FIGS. 5 and 6, it may be possible to form a composite charge 1400 from a smaller inside radius 1004 to a larger outside radius 1006, in contrast to the method discussed in connection with FIG. 17 wherein the charge 1400 is formed from the larger radius 1006 to the smaller radius 1004. The frame 1402 may be employed to join a plurality of generally rectangular ply segments 1100, and then form the charge 1400 over a tool 1002 from a smaller radius 1004 to a larger radius 1006. During the forming operation illustrated in FIGS. 22 and 23 the ply segments 1100 spread as they are being formed from the smaller radius 1004 to the larger radius 1006, resulting in the ply thickness of the charge 1400 decreasing from the smaller radius of curvature 1004 to the larger radius of curvature 1006.

Figure 24:
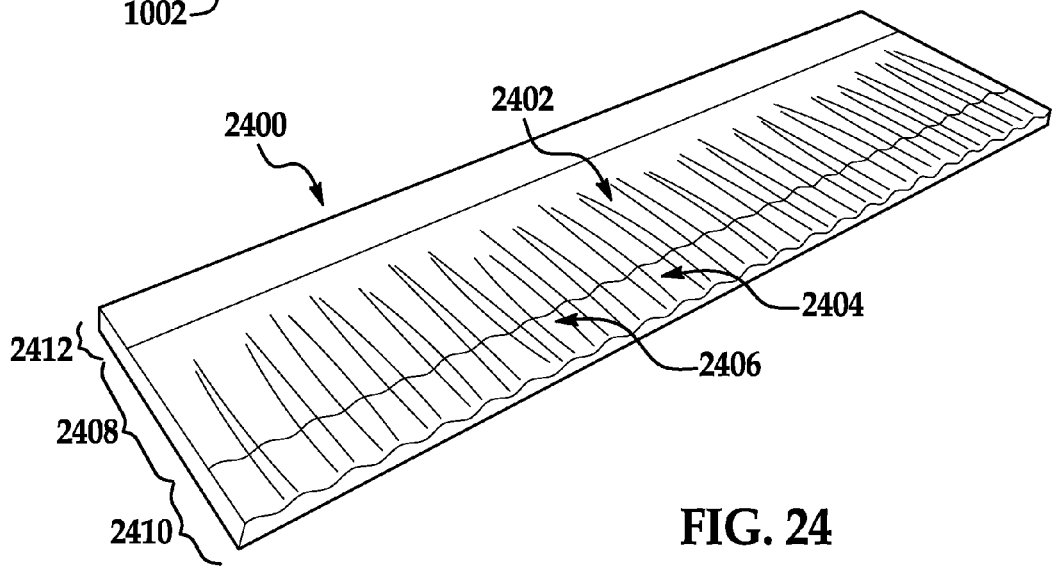
FIG. 24 is a perspective view of a flat projection of a tool similar to the tool shown in FIG. 10 but having undulating tool surfaces.

Referring also to FIG. 24, a tool 2400 includes the tool surfaces 2408, 2410 and 2412 provided with undulations 2402 formed by alternating ridges 2404 and valleys 2406. The undulations 2402 may be used to pre-form the prepreg to an intermediate shape which can then be more readily formed over the tool 1002 (FIG. 10) using a forming tool similar that shown in FIG. 18 where area of the prepreg pre-formed by tool surface 2412 is placed against the inner radius 1004, and the web area pre-formed by tool surface 2408 and outer cap preformed by tool surface 2410 are formed over tool 2400 by the forming machine 1800. Zero degree plies (not shown) may also be laid up on the tool 2400 shown in FIG. 24 by using narrow strips of tape which follow the undulated contour 2402 of the forming tool 2400. These zero degree plies may be laid over an adjacent ply. A forming tool (not shown) similar to tool 2400 shown in FIG. 24, but having undulations at a different alignment (for example 45 degrees) could also be used. The undulations 2402 on the tool 2400 allow the prepreg to stretch in a direction transverse to the fiber orientation.

Figure 25:
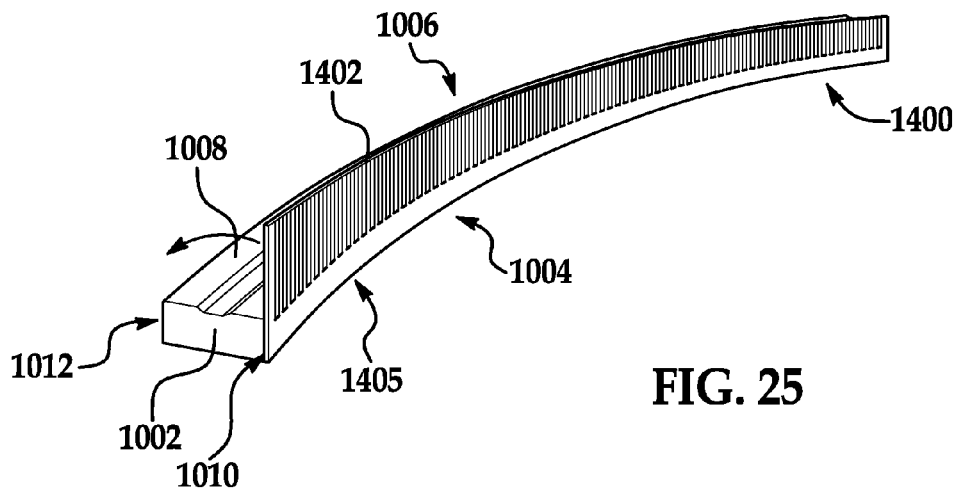
FIG. 25 is a perspective view illustrating the use of a clamping frame to form a group of ply segments over a tool from a smaller radius to a larger radius in which the slits have been formed in the individual ply segments.
Figure 26:
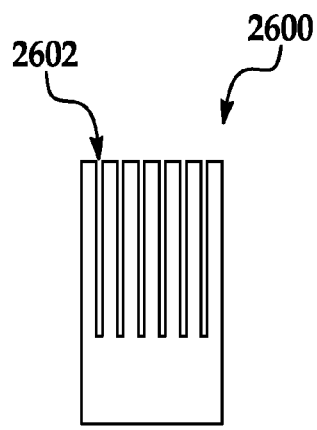
FIG. 26 is a plan view of one of the slit ply segments shown in FIG. 25.
Figure 26A:
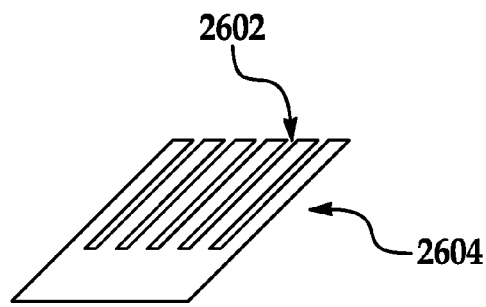
FIG. 26a is a view similar to FIG. 26 but showing a slit ply segment having a 45 degree fiber orientation.
Figure 27:
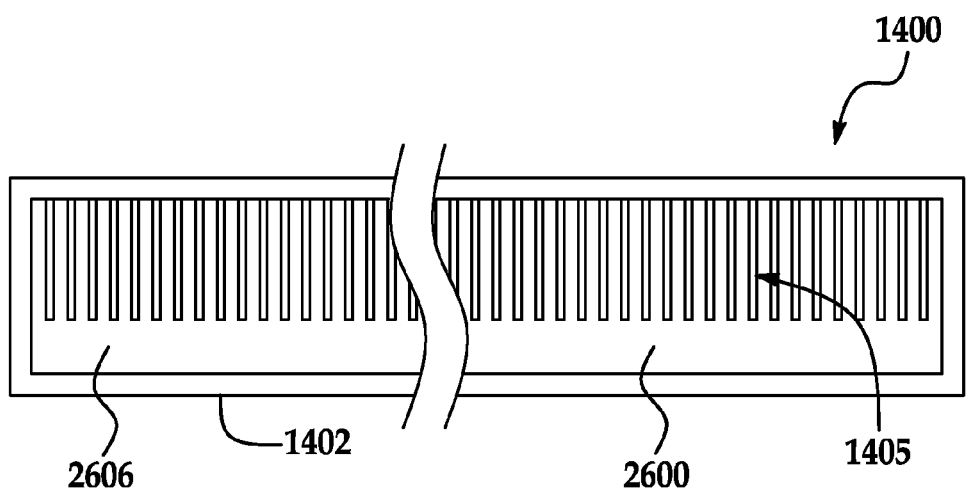
FIG. 27 is a plan view of the clamping frame shown in FIG. 25, including a clamped group of slit ply segments.

Attention is now directed to FIGS. 25-27 which illustrate an alternate method embodiment that may be used to form a charge 1400 over a tool 1002 from a smaller radius of curvature 1004 to a larger radius of curvature 1006. In this embodiment, slits 2602 are formed partially through and along one side of composite fiber tape segments 2600, which are substantially parallel to the direction of orientation of the fibers. The slit tape segments 2600 are arranged in side-by-side relationship and joined in a flexible frame 1402, as shown in FIG. 27. The base 2606 remains unslit. The frame 1402 may then be used to form the charge 1400 over tool 1002. As the forming operation is performed, the unslit base 2606 is formed onto the inner tool surface 1010 while the remaining areas of the charge 1400 are formed over tool surfaces 1008 and 1012. As the charge 1400 is being formed over tool surfaces 1008 and 1012, the slits 2602 in the tape segments 2600 allow the fibers to spread substantially uniformly as the forming process proceeds from the smaller radius of curvature 1004 to the larger radius of curvature 1006. It should be noted here that while the slit tape segment 2600 discussed above has a 90 degree fiber orientation, other orientations are possible. For example and without limitation, as shown in FIG. 26a, a slit tape segment 2604 may have a 45 degree fiber orientation.

Figure 11A:
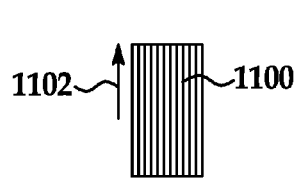
FIG. 11a is a plan view of a single ply segment having a 90 degree fiber orientation.
Figure 11B:
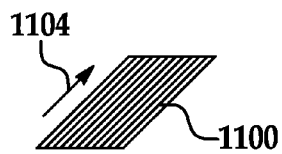
FIG. 11b is view similar to FIG. 11a but showing a ply segment having a 45 degree fiber orientation.
Figure 12A:
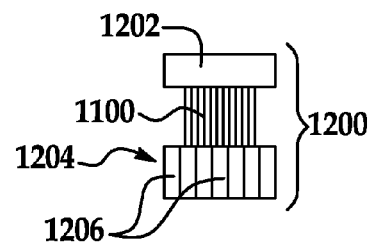
FIG. 12a is a view of the ply segment shown in FIG. 11 having been clamped in a fiber spreading device.
Figure 12B:
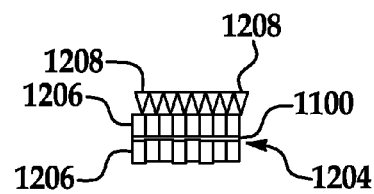
Figure 13A:
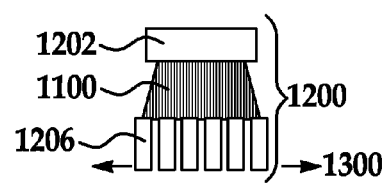
FIG. 13a is a view similar to FIG. 12a but illustrating the device having spread the fibers of the ply segment.
Figure 13B:
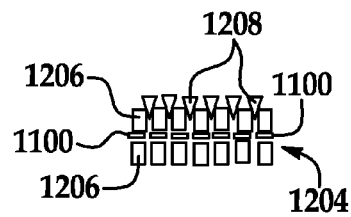
Figure 28:
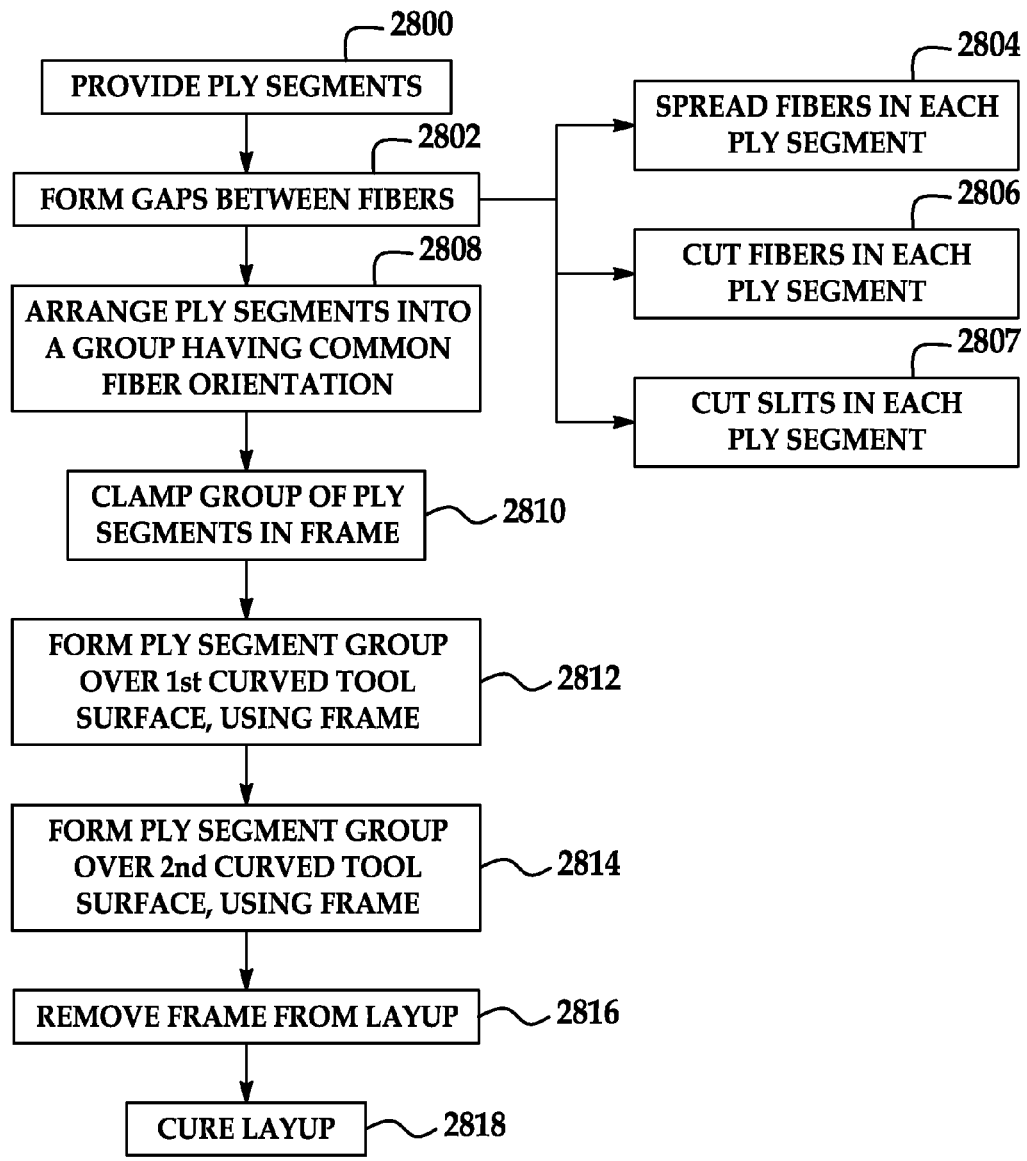
FIG. 28 is a flow diagram illustrating a method for fabricating curved composite structural elements.

Attention is now directed to FIG. 28 which illustrates the steps of a method for manufacturing a composite structural element of the type previously described. Beginning at 2800, a plurality of composite ply segments 1100 of the desired shape are provided, which may include cutting individual ply segments from a sheet or roll of composite tape. In one embodiment, gaps 1410 between the fibers in the ply segments 1100 may be formed, as shown at step 2802 either by spreading the fibers in each ply segment 1100 as shown at 2804 or by cutting fibers in the ply segments as shown at 2806 or by cutting slits in each of the ply segments as shown at 2807. In the case of ply segments that have been slit, no gaps are formed prior to joining the ply segments in a group, thus eliminating step 2802. In lieu of steps 2802 and 2808, un-slit segments 1100 as shown in FIGS. 11a and 11b may be joined or "seamed" together by ultrasonic, heat, pressure, adhesive, scrim, or any combination of these methods. These seamed segments comprise a larger ply that may be subsequently placed directly on the forming tool or placed in/on a frame or frame segment as shown in FIG. 14, essentially eliminating the gaps 1410. In this scenario the spreading of the fibers occurs as the material is swept from the smaller radius toward the larger radius as previously described.

Next, at 2808, the ply segments 1100 are arranged in side-by-side relationship to form a group 1405 having a common fiber orientation which may be for example and without limitation, 90 degrees or +/−45 degrees. Next, at 2810, the group 1405 of ply segments is joined by placing the group 1405 in a carrier frame 1402. At 2812, the group 1405 of ply segments is formed over a first curved tool surface by bringing the frame 1402 into contact with the first curved tool surface and deforming the frame 1402 so as to conform to a contour of the first curved tool surface. Then, the joined group 1405 of ply segments is formed over the second curved tool surface using the frame 1402 as shown at 2814. The frame 1402 may be removed from the formed charge 1400 at 2816 and the formed charge 1400 may be cured at 2818. Steps 2812 and 2814 may involve forming the charge from a smaller radius of curvature to a larger radius of curvature, or from a larger radius of curvature to a smaller radius of curvature, depending upon the application and the geometry of the structural element being fabricated. In forming from a smaller radius into a larger radius, the composite material may spread (no slits), fan (with slits), or extend (with undulated surface).

Figure 29:
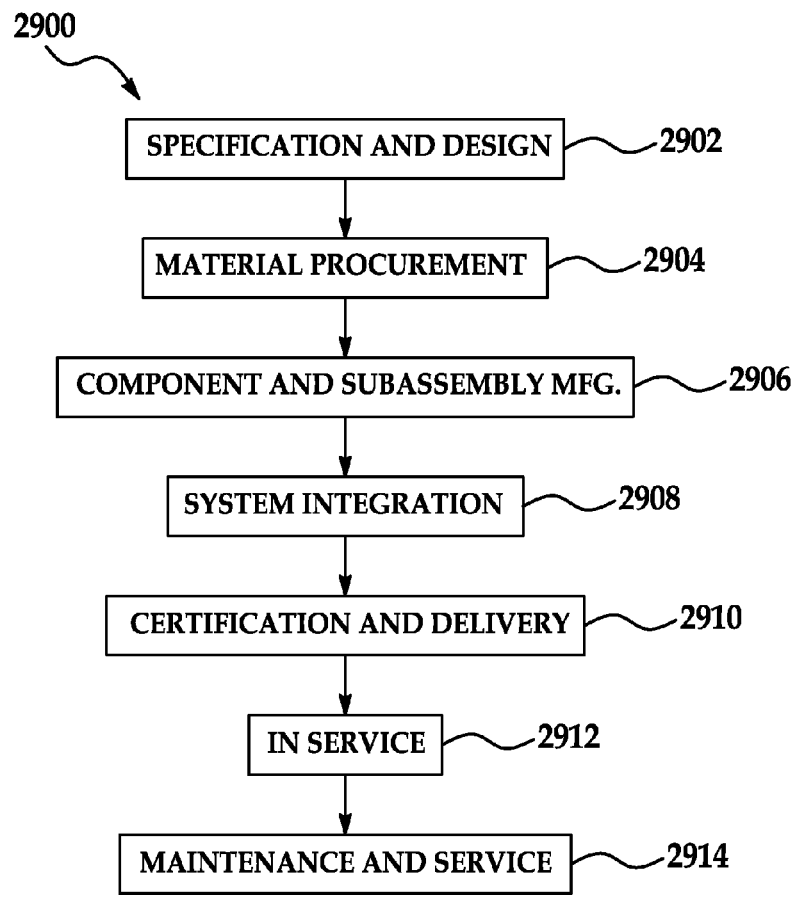
FIG. 29 is a flow diagram of aircraft production and service methodology.
Figure 30:
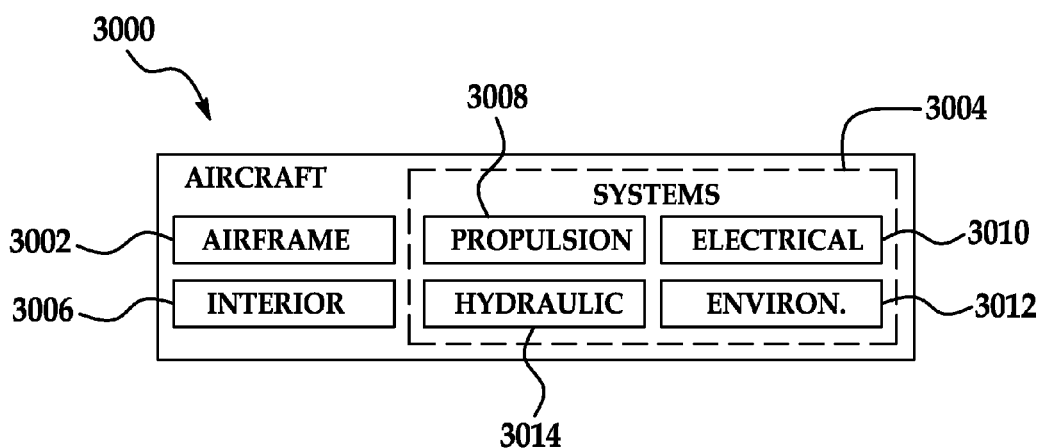
FIG. 30 is a block diagram of an aircraft.

Embodiments of the disclosure may find use in a variety of potential applications, particularly in the transportation industry, including for example, aerospace, marine and automotive applications. Thus, referring now to FIGS. 29 and 30, embodiments of the disclosure may be used in the context of an aircraft manufacturing and service method 2900 as shown in FIG. 29 and an aircraft 3000 as shown in FIG. 30. During pre-production, exemplary method 2900 may include specification and design 2902 of the aircraft 3000 and material procurement 2904. During production, component and sub-assembly manufacturing 2906 and system integration 2908 of the aircraft 3000 takes place. Thereafter, the aircraft 3000 may go through certification and delivery 2910 in order to be placed in service 2912. While in service by a customer, the aircraft 3000 is scheduled for routine maintenance and service 2914 (which may also include modification, reconfiguration, refurbishment, and so on).

Each of the processes of method 2900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 30, the aircraft 3000 produced by exemplary method 2900 may include an airframe 3002 with a plurality of systems 3004 and an interior 3006. Examples of high-level systems 3004 include one or more of a propulsion system 3008, an electrical system 3010, a hydraulic system 3014, and an environmental system 3012. Any number of other systems may be included. Although an aerospace example is shown, the principles of the disclosure may be applied to other industries, such as the marine and automotive industries.

Systems and methods embodied herein may be employed during any one or more of the stages of the production and service method 2900. For example, components or subassemblies corresponding to production process 2906 may be fabricated or manufactured in a manner similar to components or subassemblies produced while the aircraft 3000 is in service. Also, one or more apparatus embodiments, method embodiments, or a combination thereof may be utilized during the production stages 2906 and 2908, for example, by substantially expediting assembly of or reducing the cost of an aircraft 3000. Similarly, one or more of apparatus embodiments, method embodiments, or a combination thereof may be utilized while the aircraft 2900 is in service, for example and without limitation, to maintenance and service 2914.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method of fabricating a curved composite element, comprising:
   providing a plurality of composite fiber ply segments;
   joining a group of the ply segments together to form a ply, said group of ply segments held at said ply segment edges within a flexible frame;
   placing the joined group of ply segments in said frame against a first curved tool surface comprising a tool;
   wrapping the joined group of ply segments onto a second generally flat tool surface comprising said tool;
   wrapping the joined group of ply segments onto a third curved tool surface comprising said tool; and,
   curing the ply.

2. The method of claim 1 further comprising:
   arranging the ply segments in side-by-side relationship with a substantially common fiber orientation, and wherein joining a group of ply segments includes seaming the ply segments together.

3. The method of claim 1, wherein wrapping the group of ply segments includes folding the frame.

4. The method of claim 1, wherein wrapping the ply group includes wrapping the ply group from a larger radius onto a smaller radius.

5. The method of claim 1, wherein wrapping the ply group includes wrapping the ply group from a smaller radius onto a larger radius.

6. The method of claim 5, further comprising:
   forming a series of slits along one edge of each of the ply segments.

7. The method of claim 1, further comprising:
   forming gaps between adjacent ones of the ply segments in the group of ply segments.

8. The method of claim 7, wherein forming the gaps includes spreading at least certain of the fibers in each of the ply segments along an edge of the ply segment.

9. The method of claim 7, wherein forming the gaps includes cutting away portions of each of the ply segments.

10. The method of claim 1 wherein:
    the first and second curved tool surfaces are substantially contiguous and have differing radii of curvatures.

11. The method of claim 1 wherein wrapping the group of ply segments includes forming the group of ply segments from a smaller radius of curvature to a larger radius of curvature, and the method further comprises:
    using an undulating tool surface to pre-form the group of ply segments to an intermediate shape.

12. A method of laying up a curved composite element, comprising:
    arranging a group of composite fiber ply segments substantially side-by-side relationship, said group of ply segments held at said segment edges within a flexible frame;
    forming the group of ply segments in said frame onto a first curved tool surface comprising a tool having a first radius of curvature; and,
    forming the group of ply segments from the first curved tool surface onto a second generally flat tool surface comprising said tool; and
    forming the group of ply segments from the generally flat tool surface onto a third curved tool surface comprising said tool having a second radius of curvature.

13. The method of claim 12, wherein:
    the ply segments each have a fiber orientation, and arranging the group of fiber ply segments includes arranging the ply segments such that the ply segments have a substantially common fiber orientation.

14. The method of claim 12, wherein the first radius of curvature is greater than the second radius of curvature.

15. The method of claim 12, wherein the second radius of curvature is greater than the first radius of curvature.

16. The method of claim 12, wherein the first radius of curvature is different than the second radius of curvature, and the method further comprises:
    pre-forming the group of ply segments over an undulating tool surface into an intermediate shape that facilitates forming the group of ply segments onto the third tool surface.

17. The method of claim 12, further comprising:
    forming gaps between at least certain of the fibers in the ply segments along one side of the group of ply segments.

18. The method of claim 12, wherein forming gaps includes forming gaps between the fibers in at least certain of the ply segments.

19. The method of claim 12, wherein forming gaps includes forming gaps between adjacent ones of the ply segments.

20. A curved composite element laid up by the method of claim 12.

21. The method of claim 12 wherein said curved composite element comprises a structural member for an aircraft.

22. A method of fabricating a curved structural element for an aircraft, comprising:
- cutting a plurality of composite fiber ply segments from a composite sheet;
- forming a group of ply segments by arranging the ply segments in side-by-side relationship with a common fiber orientation;
- forming gaps between at least certain of the fibers in the group of ply segments;
- joining and holding the arranged group of ply segments at said ply segment edges within a flexible frame;
- using the frame to form the group of ply segments onto a first curved tool surface comprising a tool;
    - using the frame to form the group of ply segments onto a second curved tool surface comprising said tool having a radius
- of curvature different than the first curved tool surface, including folding the frame to bend the group of ply segments.

* * * * *